(12) United States Patent
Bazot et al.

(10) Patent No.: US 10,393,146 B2
(45) Date of Patent: Aug. 27, 2019

(54) VARIABLE PITCH VANE CONTROL RING BUSH RETENTION FOIL AND TURBOJET CONTAINING SAME

(71) Applicant: SAFRAN AIRCRAFT ENGINES, Paris (FR)

(72) Inventors: Olivier Bazot, Melun (FR); Jérémy Philippe Pierre Edynak, Viry-Chatillon (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 233 days.

(21) Appl. No.: 15/640,930

(22) Filed: Jul. 3, 2017

(65) Prior Publication Data

US 2018/0003193 A1 Jan. 4, 2018

(30) Foreign Application Priority Data

Jul. 4, 2016 (FR) .................................... 16 56380

(51) Int. Cl.
*F01D 17/16* (2006.01)
*F04D 29/56* (2006.01)
*F04D 29/02* (2006.01)
*F04D 29/64* (2006.01)

(52) U.S. Cl.
CPC ......... *F04D 29/563* (2013.01); *F01D 17/162* (2013.01); *F04D 29/023* (2013.01); *F04D 29/644* (2013.01); *F05D 2220/323* (2013.01); *F05D 2230/54* (2013.01); *F05D 2230/80* (2013.01); *F05D 2300/611* (2013.01); *Y02T 50/672* (2013.01)

(58) Field of Classification Search
CPC ... F01D 17/162; F04D 29/563; F05D 2250/90
See application file for complete search history.

(56) References Cited

U.S. PATENT DOCUMENTS

| 5,601,401 A * | 2/1997 | Matheny ............... F01D 17/162 |
| | | 415/160 |
| 6,688,846 B2 * | 2/2004 | Caubet .................... F01D 17/16 |
| | | 403/286 |

(Continued)

FOREIGN PATENT DOCUMENTS

| EP | 1 312 764 A2 | 5/2003 |
| FR | 2 988 787 A1 | 10/2013 |

OTHER PUBLICATIONS

Search Report as issued in French Patent Application No. 1656380, dated Feb. 23, 2017.

*Primary Examiner* — Ninh H. Nguyen
(74) *Attorney, Agent, or Firm* — Pillsbury Winthrop Shaw Pittman LLP

(57) ABSTRACT

A flexible metal foil can be fixed on the inside part of a variable pitch vane control ring of a turbojet compressor, so as to close all through holes in which lever pins and their surrounding bushes are housed. As a result, the foil can retain the shank of the bush if the bush breaks. The use of such foil does not impose the development of a new model of control ring and its impact on the mass is small enough so that it does not affect engine performances. Therefore it avoids problems related to the breakage of bushes without having to make major changes to the existing system.

9 Claims, 3 Drawing Sheets

(56) References Cited

U.S. PATENT DOCUMENTS

| | | | | |
|---|---|---|---|---|
| 6,802,692 B2 * | 10/2004 | Bouru | ............ | F01D 17/16 403/286 |
| 7,004,723 B2 * | 2/2006 | Raulin | ............ | F01D 17/162 415/160 |
| 2002/0034439 A1 | 3/2002 | Caubet et al. | | |
| 2013/0129487 A1 | 5/2013 | Colette et al. | | |

* cited by examiner

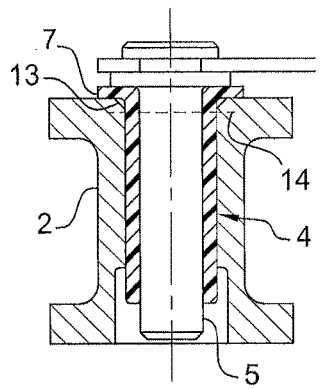 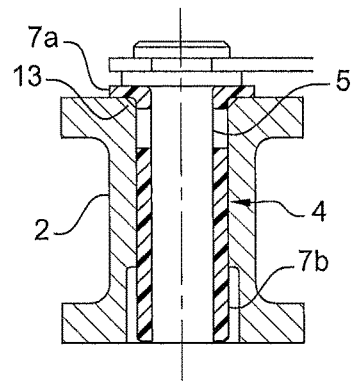 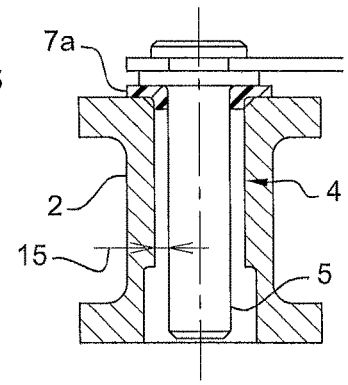
Fig. 4A    Fig. 4B    Fig. 4C
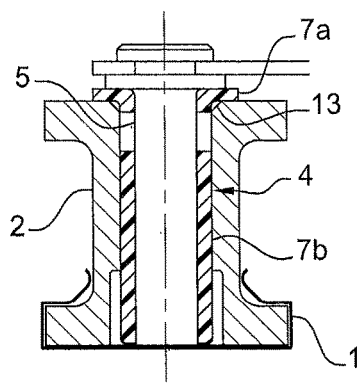
Fig. 5

VARIABLE PITCH VANE CONTROL RING BUSH RETENTION FOIL AND TURBOJET CONTAINING SAME

CROSS-REFERENCE TO RELATED APPLICATION

This application claims priority to French Patent Application No. 1656380 filed Jul. 4, 2016, the entire contents of which is incorporated herein by reference in its entirety.

TECHNICAL FIELD

This invention relates to foil for the retention of variable pitch vane control ring bushes, and a turbojet incorporating same.

Its applications include particularly high pressure compressors for high power aircraft engines or turbojets.

TECHNOLOGICAL BACKGROUND

The role of the low pressure compressor and the high pressure compressor in a turbojet is to draw air in and compress to bring it to the optimum velocity, pressure and temperature at the inlet to the combustion the chamber. The high and low pressure compressors are designed in the same manner, but there are differences in the size of their shafts and rotation speeds.

An axial compressor is composed of a set of axial stages in series, each comprising a mobile bladed wheel (or rotor) and fixed guide vanes (stator). The mobile blades of the rotor are composed of a circular disk onto which blades (rotor blades) are fixed and that rotates in front of the fixed stator vanes. Each stage of the axial compressor is sized and controlled to adapt its operating conditions perfectly to the operating conditions of other upstream and downstream stages along the direction of circulation of the air flow. In particular, the vanes of stator stages may be variable pitch, which means that it is possible to vary the angle of attack of the vanes relative to the direction of the air flow along the axis of the engine as a function of flight conditions, under the control of a slaving system.

In each stage of an axial compressor, the rotor sucks in and accelerates the air flow, deviating it relative to the axis of the engine. The next stator straightens the flow along the centre line and slows it, transforming part of its speed into pressure. In the stage directly downstream along the axis of the engine, the next rotor reaccelerates the air flow and deviates it once again from the axis of the engine, and the next stator straightens the flow once again to slow it and transform its speed into pressure. This process continues for each following stage along the axis of the engine from the upstream end to the downstream end.

In each stage, the variable pitch vanes are supported on the stator case and their position can be adjusted about the axis (or pivot) of each vane to optimise the gas flow along the axis of the engine. The angle of attack of the vanes, in other words the orientation of the variable pitch vanes of the stator relative to the axis of the engine, is controlled through one or several control elements in the form of a ring or ring segment. These ring elements or control rings are external to the case and are connected to the vanes by corresponding rods. Each of the control rings causes a change in the orientation of a plurality of vanes simultaneously.

Bushes are provided in holes formed on the inside of the control rings to hold the pins of a plurality of control levers each controlling the orientation of one vane. For example, these bushes may be made of a composite material or a metallic material. Their purpose is to assure good contact between the pin of each lever and each corresponding hole in the ring, so as to reduce friction and clearance between parts, particularly to prevent them from being deteriorated. They thus help to maintain precision of the link between the levers and the ring in the long term, since the compressor performances depend on this link.

However, a problem can arise because these bushes can break during use. Contacts between the bush and the edge at the inlet to the hole in the ring in which the lever pin fits generate a high local stress peak that can cause failure of the bush. Making a chamfer at the hole inlet can reduce this risk of failure, but cannot completely eliminate it.

The consequences of failure of a bush can vary from a reduction in the precision of the vane pitch setting, to loss of the lower part (the shank) of the bush in the core compartment of the engine and then on the tarmac when the engine covers are removed, for example for an inspection. The hole in the ring in which the control lever pin fits passes through the ring and therefore does not retain the bottom part of a bush if the bush breaks into two parts.

These effects can have serious or potentially critical consequences. Not only the increase in clearance affects good operability of the compressor, but the presence of bush shanks in the engine and then on the tarmac is not allowed according to the aircraft maintenance manual (AMM). Therefore if they are discovered during a visual inspection, airlines are obliged to make an unprogrammed engine removal to replace the broken bushes.

Finally, beyond the technical consequences on the operation of variable pitch vanes, a breakage of the bushes can have consequences on commercial operation of the plane. These consequences include particularly flight delays due to unplanned maintenance operations, leading to additional costs for airlines.

One solution to this problem could be to modify the design of the rings so as to provide means of retaining the shanks in the holes in the rings to prevent the shanks from coming free if the bushes break. This would make it possible to maintain sufficient control of the system pitch so that the compressors remain operable to a certain degree.

However, there are several disadvantages to such a "redesign" of the rings: firstly, airlines would be obliged to purchase new ring models; secondly, they would have to remove engines to be able to replace existing rings with new rings; and thirdly and finally, this "redesign" might be difficult or even impossible, at least for the IGV (Inlet Guide Vane) stages, due to the shortage of space at this ring which makes it impossible to make a new ring model larger than existing rings.

SUMMARY OF THE INVENTION

The purpose of the invention is to disclose a solution to the problem related to breakage of bushes in the above-mentioned context. It avoids the lower part of the bush (the shank) from disengaging if and when it is broken, while maintaining most of the precision of the variable pitch vanes system without imposing emergency replacement, and also without imposing the replacement of existing rings by a new model of rings.

To achieve this, the invention is based on the use of foil, namely a ribbon made of a flexible metallic material, the shape of which can be adapted to the lower part of the "I" section of a control ring, and can thus be fixed tightly on this lower part. The foil thus closes off all through holes in the control ring in which the pins of the control levers and the associated bushes are located. The foil thus prevents the bush shanks from fully disengaging from the pins if the bush breaks.

More particularly, a first aspect of the invention discloses the use of foil made of a flexible metallic material that will be fixed to the inside surface of a variable pitch vane control ring for a turbojet, said control ring comprising a plurality of through holes each of which has an internal radial opening on the side of the inside surface of the control ring and an external radial opening on the side of an outside surface of the control ring, and in each of which a bush can be housed to hold a pin of a control lever for one of the vanes, through the outer radial opening of the hole, the foil being characterised in that its length along a longitudinal direction and its width along a direction orthogonal to said longitudinal direction are adapted to close the internal radial opening of at least one hole passing through the control ring, said foil being longer than the developed length of a determined angular sector of the control ring in which the at least one pad of the control ring is located, in the angular sector in which the foil will be fixed, and in which the foil comprises a hole adapted to allow a pad support connecting the pad to the control ring to pass through, and in that it adopts a determined shape in a plane orthogonal to said longitudinal direction so that it can be fixed by click fitting onto the control ring at its internal surface.

In some embodiments, the foil may be folded along its longitudinal direction to adopt a given shape in a plane orthogonal to said longitudinal direction, to squeeze the control ring at its internal surface.

For example, the foil may comprise at least four folds along its longitudinal direction, and preferably six such folds, to adopt a shape in a section plane orthogonal to said longitudinal direction such that it squeezes the internal part of the control ring when the control ring has an "I" section.

In another embodiment, the circumferential length of the foil along the longitudinal direction is longer than the developed length of a determined angular sector of the control ring in which at least one pad of the control ring is fitted, and the foil will be fixed to said angular sector. The foil then comprises a suitable hole through which a support of the pad connecting the pad to the control ring can pass.

In other words, holes are present along the length of the foil at intervals corresponding to the distances between pads of a control ring and with dimensions (longitudinal and transversal) at least equal to the dimensions of the orifices in which the supports of said pads are housed.

As a result of using such foil, even when a bush breaks, the shank of the bush will remain in the hole in the control ring in contact with the pin of the corresponding control lever, and continues to limit play and friction in the lever/hole connection. The precision of the vane setting is certainly slightly reduced, but it remains good enough to maintain operability of the variable pitch vanes system.

Furthermore, unlike the solution that consists of replacing the control rings by a version based on a new design, the disclosed device can be used on all variable pitch stages of a high power engine. Therefore it avoids problems related to the breakage of bushes without having to make major changes to control rings installed on aircraft engines currently in operation.

Furthermore, the impact of using such foil on the mass of the stator is small enough so that it does not affect the performances of the engine.

Another aspect of the invention is related to a control assembly for variable pitch vanes of a turbojet comprising a variable pitch vane control ring, said control ring having an inside surface and an outside surface and having:

at least one pad located in a determined angular sector of the control ring, at least at its internal surface; and, a plurality of through holes each with an internal radial opening on the side of the inside surface of the control ring and an external radial opening on the side of an outside surface of the control ring, in each of which a bush can be housed to hold a pin of a control lever of one of the vanes, through the external radial opening of the hole, said control assembly being characterised in that it also comprises foil made of a flexible material fixed to the inside surface of the control ring, said foil having:

a length along a longitudinal direction and a width along a direction orthogonal to said longitudinal direction that are adapted to close the internal radial opening of at least one through hole in the control ring, said foil length being longer than the developed length of a determined angular sector of the control ring in which at least one pad of the control ring is located, at the angular sector at which the foil will be fixed;

a determined shape in a section plane orthogonal to the longitudinal direction by which it can be fixed by click fitting onto the control ring at its inner surface, and, a suitable hole through which a support of said pad connecting said pad to the control ring can pass.

One final aspect of the invention relates to a turbojet comprising a compressor stator with variable pitch vanes and also comprising a control ring of said variable pitch vanes. The turbojet comprises foil according to the first aspect described above, fixed on an inside surface of the control ring.

In one example, the bushes are made of a composite material.

Furthermore, the inside surface of the control ring that will come into contact with the foil when the foil is fixed on the control ring or the surface of the foil that will come into contact with the control ring can be coated with a contact varnish that has good properties for making an efficient contact between the foil and the control ring.

BRIEF DESCRIPTION OF THE DRAWINGS

Other characteristics and advantages of the invention will become clear after reading the following description of non-limitative embodiments, with reference to the appended figures among which;

FIGS. 4A, 4B and 4C are sectional views of a control ring centred on a hole and illustrating the different phases associated with the breakage of a bush;

FIG. 5 is a sectional view of a control ring centred on a hole and having a pin of the lever in the hole surrounded by a broken bush, the lower part of which is retained by the bush retention foil in FIG. 3;

in FIG. 6A, en embodiment of the invention with an implementation comprising only two foil sectors each covering the angular sectors of a ring, at about 180 degrees each, and through which several ring roots pass;

in FIG. 6B, another possible approach as a variant embodiment of the invention with a layout including a set of foil sectors with circumferential lengths approximately equal to the circumferential distances between pads of the ring, and each of which can be installed between two circumferentially adjacent pads without needing to disassemble the pads.

DETAILED PRESENTATION OF EMBODIMENTS

Figure 1:
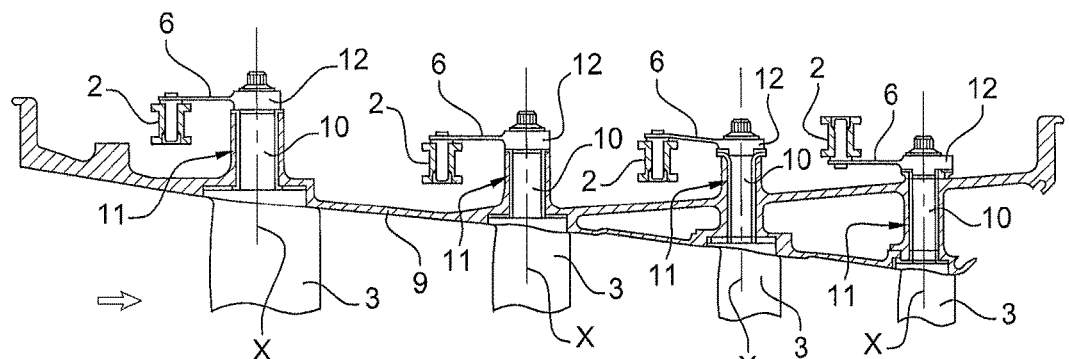
FIG. 1 is a sectional view of the fixed part of a turbojet compressor with a case supporting a set of variable pitch vanes extending in the radial direction inside said case.

FIG. 1 illustrates a sectional view of a high pressure compressor stator case 9 supporting a set of variable pitch vanes 3. More particularly, FIG. 1 shows four stator stages arranged in pairs from left to right, along the air flow direction represented by an arrow. The vanes 3 extend in the radial direction inside the case 9 (towards the bottom of FIG. 1) and there is a pivot 10 at the top of each that can be made from the same as the corresponding vane. In the vane position shown in the case 9, the corresponding pivot 10 is coaxial with the longitudinal X axis of a cylindrical orifice 11 passing through the case 9, associated with the vane. The head 12 of the pivot 10 is connected to a control ring 2 through a manoeuvre arm or control lever 6.

Figure 2:
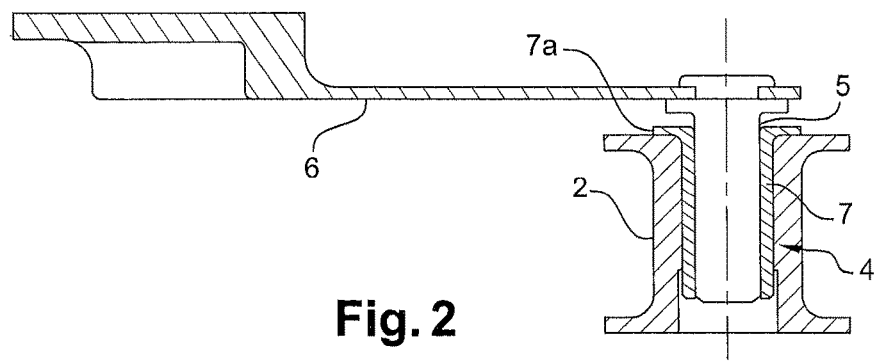
FIG. 2 is a sectional view of a pivot link sliding between a control lever and a control ring.

FIG. 2 illustrates a cross-sectional view of a control ring 2 connected to an associated control lever 6, through a "sliding pivot" type mechanical connection. This connection is made by a cylindrical pin 5, said pin is fixed to the lever 6 and is housed in a through orifice 4 provided in the ring 2, also called the "ring hole". The part of the pin 5 that is in contact with the ring 2 is in contact through a cylindrical bushing 7 that surrounds said pin and is itself in direct contact with the internal walls of the ring hole 4. The head 7a of the bush is folded like a collar hammered flat so as to cover the external surface of the ring 2 around the entry to the hole 4 on the side of the control lever 6.

The function of the bush 7 is to act as a liner for the hole 4 to restrict the clearance and friction inherent to the sliding pivot type link between the control lever 6 and the control ring 2.

Translation of the control ring 2 along an axis perpendicular to the section plane in FIG. 2 thus drives the control lever 6 that is fixed to the pin 5 located in the vane hole 4 and thus causes rotation of the pivot 10 of a vane, and therefore rotation of the vane to which said pivot is fixed.

A control ring 2 comprises a set of ring holes like hole 4 in FIG. 2, that controls all variable pitch vanes in a determined stage of the compressor simultaneously and identically.

Figure 3:
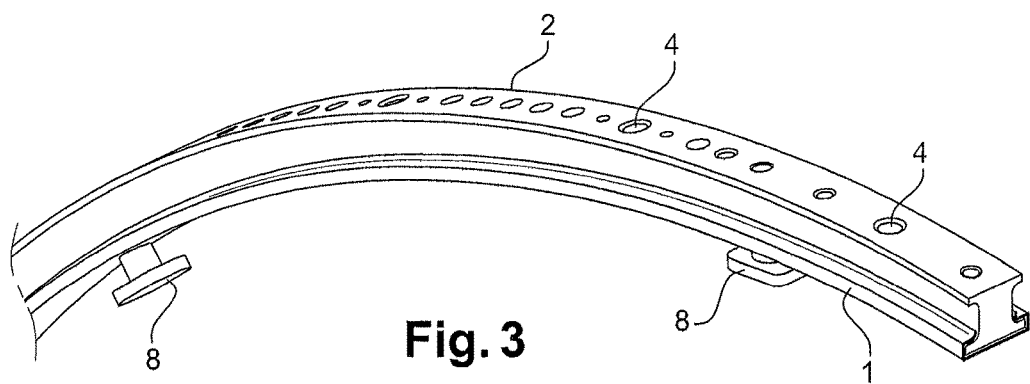
FIG. 3 shows the lower part of a control ring closed at its bottom end by bush retention foil in accordance with embodiments of the invention.

FIG. 3 illustrates an overview of a control ring 2, the inside surface of which is closed by bush retention foil 1 fixed on said ring. Such foil is made, for example, by a flexible metal strip extending along the longitudinal direction of the control ring 2, i.e. along a perimeter of said ring. Since the control ring is in the form of an arc, the terms "internal" and "external" are used in the following with reference to the curvature of the ring; the inside surface of the ring 2 is the surface on the concave side of the ring (bottom, FIG. 3), and the outside surface of the ring 2 is the surface on the convex side of the ring (top, FIG. 3).

For example, the length of a foil element can cover the entire length of one of the two parts of a two-part control ring corresponding approximately to angular sectors of 180 degrees each. The "length" of the foil or a foil element or control ring in this description refers to the developed length along the longitudinal direction of the foil element extending over an inside perimeter of the control ring, of an angular sector of said foil element or said control ring respectively.

The external orifices in FIG. 3 of the holes passing through ring 4 are visible over the entire outside surface of said ring and are present over its entire longitudinal length. The foil 1 covers the entire inside surface of the ring 2 except for the housing orifices of the pads 8 of said ring 2. To achieve this, the dimensions of the orifices in the foil 1 are at least the same size as the dimensions of pad housings in the control ring and are aligned with these housings.

FIG. 4A shows a sectional view of a control ring 2 containing the pin 5 of a control lever and a bush 7 in which said pin 5 fits, inside one of its ring holes 4. The bush may be made of ceramic for its good contact properties, particularly low friction and good resistance to wear.

In the example illustrated on FIGS. 4A, 4B and 4C, it is represented in section, and grey. In the case in FIG. 4A, the bush 7 is complete, i.e. unbroken. In the case in FIG. 4B, the bush 7 is broken at the edges of the hole 13 opening up on the outside surface of the ring (i.e., at the top on FIG. 4B) causing most of the shank 7b of the bush to drop by gravity (downwards on FIG. 4B) while the head 7a of the bush that is therefore separated from the shank 7b remained in its initial position.

The internal part of the control ring 2 (i.e., at the bottom on FIG. 5) is squeezed in the transverse direction (i.e. along a direction orthogonal to the longitudinal direction of the ring 2) by flexible metal foil 1 such that the through hole 4 is closed at its projecting end opening up on the inside surface of the ring 2.

The foil 1 retains the bush 1 particularly by retaining the shank 7b of the bush 7 inside the ring hole 4 if the bush breaks. This is what is shown in FIG. 5. This thus prevents the shank of the bush from dropping into the engine. This also has the advantage that the shank 7b of the bush 7 is kept in contact with a large portion of the surface of the pin 5 of the control lever and the inside wall of the ring hole 4.

In the example shown in FIG. 5, the shape of the foil section in a plane orthogonal to the longitudinal axis of the ring 2 and the foil 1 (therefore in the plane of the figure) adopts the external contour of the lower part of the "I" section of the ring 2. In this way, the foil squeezes the ring so that it can be fixed on it.

More particularly, in one embodiment the foil comprises folds along the longitudinal direction to adopt a determined shape in a section plane orthogonal to said longitudinal direction (corresponding to the plane in FIG. 5), so that it can be fixed by click fitting onto the control ring at its internal surface.

As shown in FIG. 5, the foil can for example include at least four folds, and preferably six folds extending along the longitudinal direction. The result is that the shape in the section plane orthogonal to said longitudinal direction of the foil is such that the internal part of the control ring can be squeezed, for example when the section of the control ring is an "I" section as shown on FIG. 5.

The invention is not limited by the shape of the foil in the section plane. Curves rather than folds could be envisaged. Moreover, although the shape of the foil in the section plane in FIG. 5 is symmetric, this is not an obligation. Other embodiments can be envisaged depending on the constraints of the envisaged application.

Advantageously, the natural elasticity of the foil 1 contributes to holding it in place. However, if necessary the foil can slide on the ring when pushed by an operator. The embodiment with six longitudinal folds as shown in FIG. 5 makes it easier, if necessary, to pass a tool between the control ring 2 and the foil 1, to displace or disengage the foil from the control ring. Thus, an operator can make the orifices in which the pads 8 of the ring are housed (FIG. 3) coincide with the orifices in the foil provided to allow said pads to pass through, as in the embodiment shown in FIG. 6A that will now be presented.

Figure 6A:
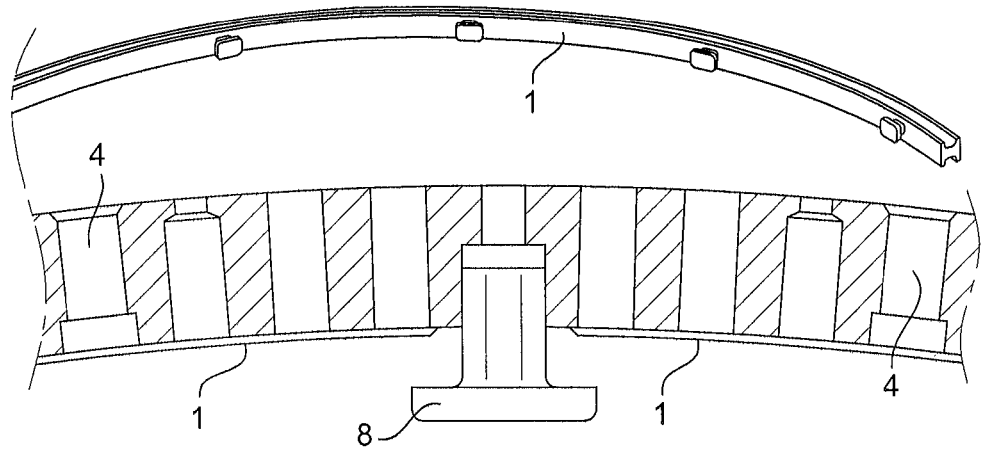
FIG. 6A and FIG. 6B each show a top view and a sectional elevation view of control rings with one or more pieces of retention foil, namely.
Figure 6B:
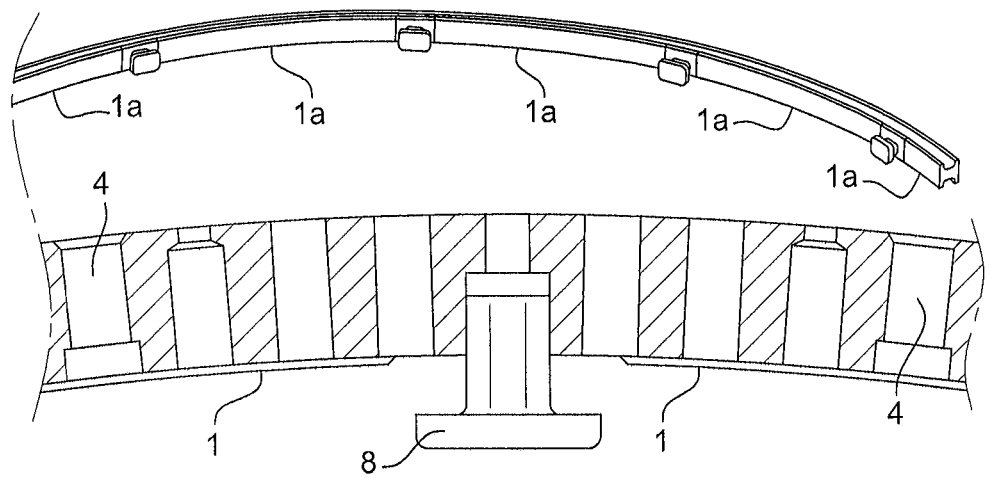

FIGS. 6A and 6B illustrate a method of making the bush retention foil according to the invention and a variant for making the bush retention foil, respectively.

FIG. 6A shows a bottom view (top image) and a sectional elevation view (bottom image) of a portion of foil fixed on one of two parts of a control ring 2 composed of at least two separate parts, for example each covering an angular sector of about 180 degrees. In other words, the length of the foil along the longitudinal direction is greater than the developed length of a determined angular sector of the control ring in which at least one pad 8 of the control ring is fitted, and the foil will be fixed to said angular sector. Consequently, the foil comprises a suitable hole through which part of the support of the pad connecting the pad to the control ring can pass.

More particularly, the foil can comprise a number of orifices (or holes) corresponding at least to the number of pads on the ring. These orifices are also placed such that their position matches the pads along the longitudinal axis of the foil and the ring, respectively. The circumferential length of the hole is adapted to allow part of the pad support, or stand, connecting the pad to the control ring, to pass through. With this embodiment, the pads 8 have to be removed to put the foil into position and the orifices provided in the foil have to be aligned with the locations of the pads 8 on the inside surface of the ring 2. The longitudinal and transverse dimensions of the openings in the foil have to be sufficient to be able to lift the pads once the foil has been put into place.

FIG. 6B shows a bottom view (top picture) and a sectional elevation view (bottom picture) of a portion of a control ring on which several foil elements with different lengths are fixed, each corresponding to the inter-pad distance between two adjacent pads longitudinally along ring 2. Each foil element 1a thus covers an interpad distance specific to it. Thus, an interval is left between two longitudinally adjacent pieces of foil that is more than the longitudinal length of a pad, or at least of its stand or pad support.

In the embodiment described above with reference to FIG. 6A, the pads are removed so that the foil can be fixed on the inside part of the ring. If necessary, the foil is slid in the longitudinal direction once it has been click fitted onto the ring 2, so as to align existing orifices with orifices existing along the ring. This solution has the advantage of only requiring a small number of additional parts, namely for example two foil parts each covering an angular sector of about 180 degrees when the control ring is itself composed of two angular sectors, each about 180 degrees. The number of part references to be managed is limited.

On the other hand, in the variant in FIG. 6B, the foil is composed of a larger number of parts, namely each of the foil elements covering a portion of the inter-pad circumferential length of the control ring. In other words, the length of foil along the longitudinal direction covers not more than the developed length of an angular sector between two adjacent pads 8 on the control ring 2. These elements are not necessarily identical to each other, and in particular their longitudinal dimensions may be different. Together, these foil elements inserted between the pads 8 of the ring cover the entire circumference of the ring (about 360 degrees). This embodiment has the advantage that foil can be fixed onto the ring directly without needing to disassemble the pads present on its internal surface.

It will be noted that the embodiment in FIG. 6A could be combined with the variant embodiment of foil illustrated in FIG. 6B. Thus, part of the foil conforming with the embodiment in FIG. 6A could be used in one or several angular portions of the ring, and a plurality of foil elements conforming with the approach illustrated in FIG. 6B could be used in one or several other angular portions of the ring. Also, in an embodiment of the turbojet according to the third aspect of the invention, the first embodiment could be chosen for a given stage of the compressor, and the variant could be chosen for at least one other stage.

The invention also discloses a turbojet comprising a compressor stator with variable pitch vanes and also comprising a control ring of said variable pitch vanes. The turbojet can be fitted with foil like that described above. The foil is fixed to an inside surface of the control ring.

In one embodiment, the inside surface of the control ring that will come into contact with the foil when the foil is fixed to the control ring, is coated with contact varnish. For example, this varnish can be adapted to prevent the foil from slipping relative to the control ring. Due to this varnish, each element of the foil adheres to the inside perimeter of the control ring.

It will be noted that either as a variant or as a complement, the face of the foil that will come into contact with the control ring when the foil is fixed to the control ring can be coated with contact varnish identical to or similar to that mentioned above.

This invention is not limited to the embodiments presented herein. Other variants and embodiments can be deduced and implemented by an expert in the subject after reading this description and the appended Figures.

The invention claimed is:

1. A foil made from a flexible metal material and to be fixed to an inside surface of a vane control ring with variable pitch for a turbojet, said control ring comprising a plurality of through holes each with an internal radial opening on a side of the inside surface of the control ring and an external radial opening on a side of an outside surface of the control ring, in each of which a bush can be housed to hold a pin of a control lever of one of the vanes, through the external radial opening of the hole, the foil having a length along a longitudinal direction and a width along a direction orthogonal to said longitudinal direction that are adapted to close the internal radial opening of at least one through hole in the control ring, said foil length being longer than the developed length of a determined angular sector of the control ring in which at least one pad of the control ring is located, at the angular sector at which the foil is to be fixed, and in which the foil contains an adapted hole to allow a pad support to pass through connecting the pad to the control ring, and wherein the foil adopts a determined shape in a section plane orthogonal to said longitudinal direction by which the foil can be fixed by click fitting onto the control ring at its inner surface.

2. The foil according to claim 1, comprising at least four folds along its longitudinal direction, to adopt a shape in a section plane orthogonal to said longitudinal direction such that it squeezes the internal part of the control ring when the control ring has an I section.

3. The foil according to claim 2, comprising six folds extending along the longitudinal of the foil.

4. The foil according to claim 3, the length of which along the longitudinal direction is approximately equal to the developed length of a 180-degree angular sector of the control ring, on the side of the internal face of said control ring.

5. The foil according to claim 1, wherein one face of the foil to come into contact with the control ring when the foil is fixed to the control ring, is coated with contact varnish.

6. A turbojet comprising a compressor stator with variable pitch vanes, a control ring of said variable pitch vanes, and a foil according to claim 1 fixed on an inside surface of the control ring.

7. The turbojet according to claim 6, wherein the bushes are made of a composite material.

8. The turbojet according to claim 6, wherein the inside surface of the control ring to come into contact with the foil when the foil is fixed to the control ring, is coated with contact varnish.

9. A control assembly for variable pitch vanes of a turbojet comprising a variable pitch vane control ring, said control ring having an inside surface and an outside surface and having:

at least one pad located in a determined angular sector of the control ring, at least at its internal surface; and, a plurality of through holes each with an internal radial opening on a side of the inside surface of the control ring and an external radial opening on a side of an outside surface of the control ring, in each of which a bush can be housed to hold a pin of a control lever of one of the vanes, through the external radial opening of the hole, said control assembly comprising a foil made of a flexible material fixed to the inside surface of the control ring, said foil having:

a length along a longitudinal direction and a width along a direction orthogonal to said longitudinal direction that are adapted to close the internal radial opening of at least one through hole in the control ring, said foil length being longer than the developed length of a determined angular sector of the control ring in which at least one pad of the control ring is located, at the angular sector at which the foil will be fixed;

a determined shape in a section plane orthogonal to the longitudinal direction by which it can be fixed by click fitting onto the control ring at its inner surface, and, a suitable hole through which a support of said pad can pass; to connect said pad to the control ring.

* * * * *